United States Patent
Zhu et al.

(10) Patent No.: US 10,045,261 B2
(45) Date of Patent: Aug. 7, 2018

(54) METHODS, SYSTEMS, AND DEVICES FOR HANDOVER IN MULTI-CELL INTEGRATED NETWORKS

(71) Applicant: Intel Corporation, Santa Clara, CA (US)

(72) Inventors: Jing Zhu, Portland, OR (US); Nageen Himayat, Fremont, CA (US); Alexander Sirotkin, Petach Tikva (IL); Alexandre S. Stojanovski, Paris (FR); Vivek Gupta, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 145 days.

(21) Appl. No.: 14/566,582

(22) Filed: Dec. 10, 2014

(65) Prior Publication Data

US 2016/0174111 A1    Jun. 16, 2016

(51) Int. Cl.
*H04W 36/00* (2009.01)
*H04W 52/26* (2009.01)
*H04W 28/02* (2009.01)
*H04W 84/12* (2009.01)

(52) U.S. Cl.
CPC ... *H04W 36/0033* (2013.01); *H04W 36/0055* (2013.01); *H04W 28/0268* (2013.01); *H04W 36/0038* (2013.01); *H04W 52/26* (2013.01); *H04W 84/12* (2013.01)

(58) Field of Classification Search
CPC ........... H04W 76/046; H04W 28/0268; H04W 52/26; H04L 29/06707
See application file for complete search history.

(56) References Cited

U.S. PATENT DOCUMENTS

| 7,961,684 | B2 | 6/2011 | Sood |
| 8,955,054 | B2 | 2/2015 | Krishnaswamy et al. |
| 9,426,649 | B2 | 8/2016 | Sirotkin et al. |
| 2006/0079241 | A1* | 4/2006 | Faccin ............... H04W 36/18 455/450 |
| 2006/0256763 | A1* | 11/2006 | Nguyen ............... H04L 63/06 370/338 |
| 2008/0240439 | A1 | 10/2008 | Mukherjee et al. |
| 2008/0267407 | A1 | 10/2008 | Vanderveen |

(Continued)

FOREIGN PATENT DOCUMENTS

| EP | 2273818 | A1 | 1/2011 |
| EP | 2879432 | A1 | 6/2015 |
| WO | 2013055106 | A2 | 4/2013 |
| WO | 2014015781 | A1 | 1/2014 |
| WO | 2015116413 | A1 | 8/2015 |

OTHER PUBLICATIONS

R2-130270, "Considerations on requirements and scenarios of WLAN/3GPP Radio Interworking", Jan. 28-Feb. 1, 2013.*

(Continued)

*Primary Examiner* — Salvador E Rivas
(74) *Attorney, Agent, or Firm* — Schwabe, Williamson & Wyatt, P.C.

(57) ABSTRACT

Embodiments of the present disclosure describe methods, systems, and devices for handover in multi-cell integrated networks. Various embodiments may include transmission of WLAN context information and/or target WLAN information in evolved universal terrestrial radio access network (EUTRAN) handover messages. Other embodiments may be described and/or claimed.

9 Claims, 8 Drawing Sheets

(56) References Cited

U.S. PATENT DOCUMENTS

| | | | | |
|---|---|---|---|---|
| 2009/0016247 A1* | 1/2009 | Sood | ............... | H04W 12/06 370/310 |
| 2009/0271471 A1* | 10/2009 | Mannar | ............ | G06Q 10/06 709/202 |
| 2014/0376515 A1* | 12/2014 | Lei | ............... | H04W 36/0061 370/331 |
| 2015/0163656 A1* | 6/2015 | Son | ............... | H04W 8/26 370/338 |
| 2016/0095037 A1* | 3/2016 | Morita | ............ | H04W 12/06 370/331 |

OTHER PUBLICATIONS

R2-130270, "Considerations on requirements and scenarios of WLAN/3GPP Radio Interworking", Jan. 28-Feb. 1, 2013 (Year: 2013).*

Invitation to Pay Additional Fees and, Where Applicable, Protest Fee for International Application No. PCT/US2015/059416 dated Jan. 26, 2016; 8 pages.

International Search Report and Written Opinion for International Application No. PCT/US2015/059416 dated Apr. 5, 2016; 18 pages.

New Postcom; "Considerations on requirements and scenarios of WLAN/3GPP Radio," 3GPP TSG RAN WG2 Meeting #81; R2-130270; St. Julian's, Malta, Jan. 28-Feb. 1, 2013; Agenda Item: 5.1; 4 pages.

3GPP, "Evolved Universal Terrestrial Radio Access (E-UTRA) and Evolved Universal Terrestrial Radio Access Network (E-UTRAN); Overall description; Stage 2 (Release 12)," 3GPP TS 36.300 V12.3.0 (Sep. 2014), Sep. 23, 2014, 215 pages.

IEEE Standard Association, "Part 11: Wireless LAN Medium Access Control (MAC) and Physical Layer (PHY) Specifications," IEEE Std 802.11™-2012 (Revision of IEEE Std 802. Nov. 2007), IEEE Standard for Information technology—Telecommunications and information exchange between systems Local and metropolitan area networks—Specific requirements, IEEE Computer Society, LAN/MAN Standards Committee, Mar. 29, 2012, New York, NY, 2,793 pages.

* cited by examiner

METHODS, SYSTEMS, AND DEVICES FOR HANDOVER IN MULTI-CELL INTEGRATED NETWORKS

FIELD

Embodiments of the present disclosure generally relate to the field of wireless communication, and more particularly, to methods, systems, and devices for handover in multi-cell integrated networks.

BACKGROUND

A multi-cell scenario may exist in a communication environment in which a device at a particular location is integrated with a wireless local area network (WLAN) access point (AP) and a $3^{rd}$ Generation Partnership Project (3GPP) evolved node B (eNB). This may be referred to as integrated small-cell and WLAN (ISW). In some situations, the WLAN connection may be anchored through the 3GPP connection. For example, a Yy interface may be provided as a point-to-point (p2P) link between a user equipment (UE) and an eNB. If the UE moves from one ISW to another, the handovers of the 3GPP and WLAN connections may not sufficiently account for the anchored WLAN connection.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

Figure 1:
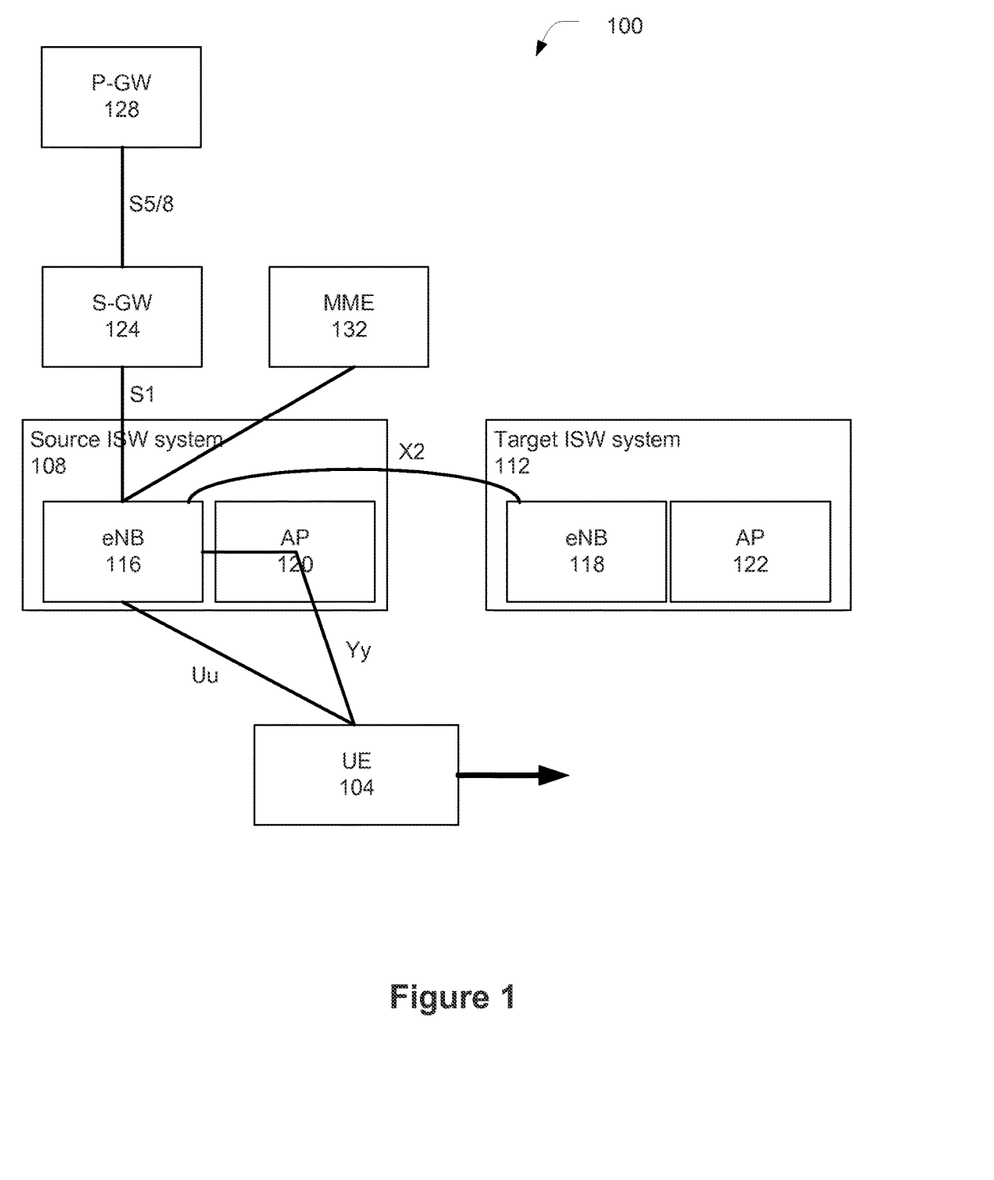
FIG. 1 schematically illustrates a wireless communication environment in accordance with various embodiments.

FIG. 1 schematically illustrates a wireless communication environment 100 in accordance with various embodiments. The environment 100 may include a user equipment (UE) 104 in wireless communication with one or more ISW systems. FIG. 1 illustrates a source ISW system 108 and a target ISW system 112. The source ISW system 108 may include an eNB 116 and an access point (AP) 120. The target ISW system 112 may similarly include an eNB 118 and an AP 122. The eNB 116 may be co-located with AP 120, and the eNB 118 may be co-located with AP 122. As used herein, co-located components may refer to components that are disposed in a common housing and/or disposed in separate housings at a common location.

In some embodiments, an ISW system may include an eNB and a WLAN access controller that controls and otherwise communicates with a lightweight WLAN AP. In such an embodiment, the lightweight WLAN AP may be disclosed remotely from the ISW system. As used herein, a WLAN node may refer to a WLAN AP, a WLAN access controller, or a lightweight WLAN AP.

Embodiments disclosed herein describe a handover operation in which the radio access services are handed over from ISW system 108 to the ISW system 112. Therefore, ISW system 108 may be referred to as a source ISW system 108 (and source eNB 116 and source AP 120), while ISW system 112 is referred to as a target ISW system 112 (and target eNB 118 and target AP 122). It will be understood that the source and target adjectives are not limiting, but are merely provided for descriptive purposes in the context of the discussed handover.

The eNB 116 may be the component of the source ISW system 108 that provides a universal terrestrial radio access network (EUTRAN) cell for the UE 104 to access a 3GPP network, for example, a long-term evolution (LTE) network or an LTE-Advanced (LTE-A) network. The interface between the eNB 116 and the UE 104 may be referred to as a Uu interface. The eNB 116 may use evolved universal terrestrial radio access (E-UTRA) protocols orthogonal frequency division multiplexing multiple access (OFDMA) and/or single carrier frequency division multiple access (SC-FDMA) on the Uu interface. The eNB 116 may communicate with the eNB 118 by an X2 interface.

The AP 120 may be the component of the source ISW system 108 that provides a WLAN cell for the UE 104 according to WLAN protocols. The AP 120 may also communicate with the eNB 116 to provide a Yy interface as a p2p link between the UE 104 and the eNB 116 through the AP 120.

The environment 100 may further include a serving gateway (S-GW) 124 and a packet gateway (P-GW) 128. The S-GW 124 and the P-GW 128 may be components of an evolved packet core (EPC) of a 3GPP network, while the ISW systems, for example, source ISW system 108 and target ISW system 112, may be components of an EUTRAN of the 3GPP network.

The S-GW 124 may manage and store UE contexts, for example, parameters of an IP bearer service, and network internal routing information. The S-GW 124 may route and forward user data packets and may further act as a mobility anchor for user plane during inter-eNB handover.

The P-GW 128 may interface with external packet data networks to transfer data between the UE 104 and the external packet data networks. The P-GW 128 may perform a variety of functions including, for example, policy enforcement, packet filtering, charging support, lawful interception and packet screening.

The S-GW 124 may communicate with the eNB 116 through an S1 interface and may further communicate with the P-GW 128 through an S5 and/or an S8 interface.

The EPC may also include a mobility management entity (MME) 132. The MME 132 may function as a control node for the EUTRAN. It may perform the bearer activation/deactivation processes, may choose an S-GW with which a UE will associate at an initial attach and at a time of intra-LTE handover involving core network (CN) node relocation, etc. The non-access stratum signaling may terminate at the MME 132.

In various embodiments, the target ISW system 112 may include communication interfaces similar to those described above with respect to the source ISW system 108. The target ISW system 112 may be associated with the same or different components of the EPC as the source ISW system 108.

Embodiments of the present disclosure describe processes for handovers in which various connections of the UE 104 are transferred from the source ISW system 108 to the target ISW system 112. As described herein, the eNB's of the ISW systems may serve as a mobility anchor to simultaneously handle inter-WLAN and inter-eNB handovers for the ISW systems. In this manner, the UE 104 may prioritize the use of 3GPP mobility protocols over the X2 interface to perform inter-cell handovers to support both inter-eNB and inter-WLAN mobility. To facilitate 3GPP-controlled inter-cell handovers, embodiments provide WLAN context transfer during mobility events to be managed as part of 3GPP mobility management protocols over the X2 interface.

Figure 2:
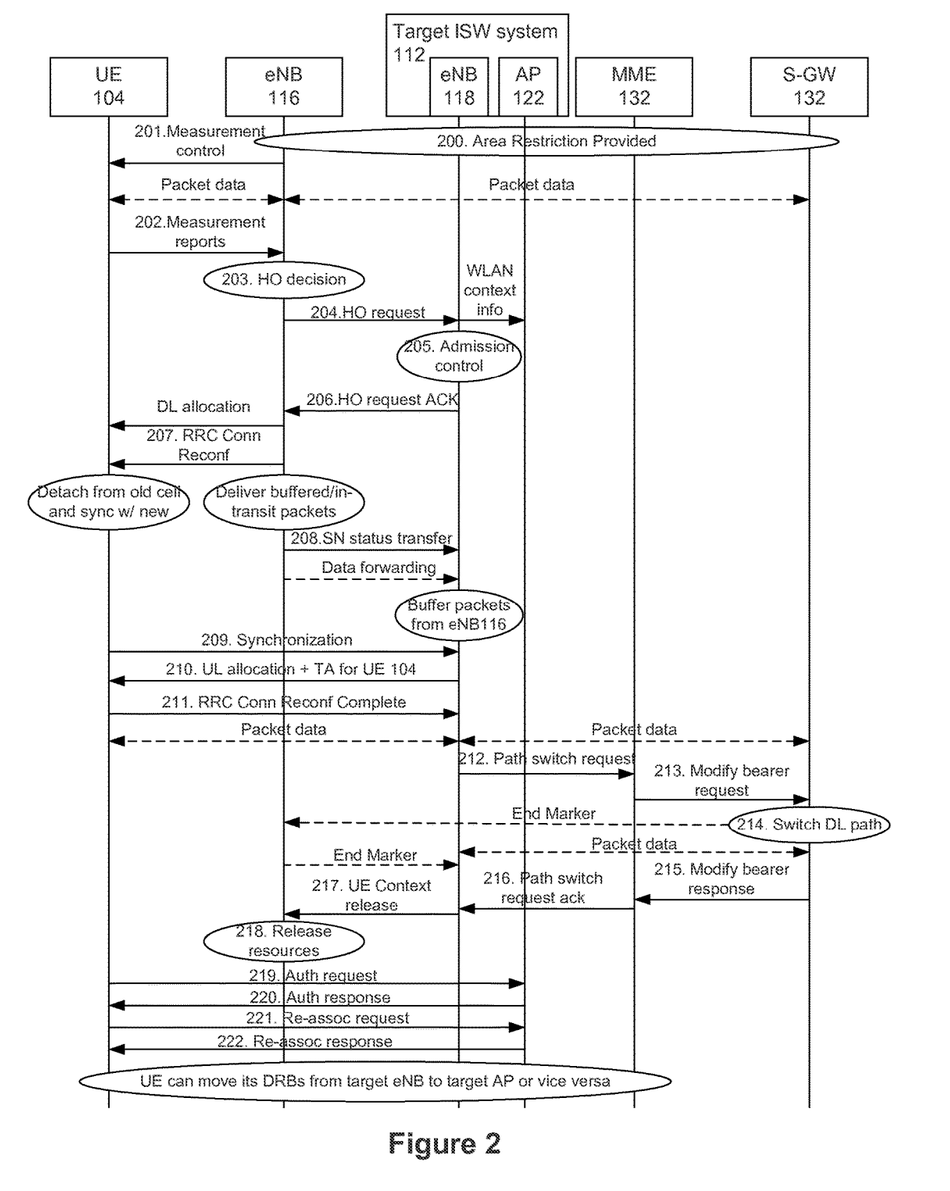
FIG. 2 illustrates a handover procedure in accordance with various embodiments.

FIG. 2 illustrates a handover procedure in accordance with embodiments of the present disclosure.

At 200, an area restriction may be provided. A context of the UE 104 within the eNB 116 may include information regarding roaming an access restrictions that were provided either at connection establishment or at a last tracking area update.

At 201, measurement control procedures may be performed. The eNB 116 may configure the UE 104 with measurement procedures according to roaming and access restriction information. Measurements provided to the eNB 116 may assist a function controlling the connection mobility of the UE 104.

Packet data may be transmitted between the UE 104 and the eNB 116 and may further be transmitted between the eNB 116 and the S-GW 132.

At 202, measurement reports may be transmitted from the UE 104 to the eNB 116. A measurement report may be triggered based on an event, a schedule, etc.

At 203, a handover (HO) decision may be made by the eNB 116. The HO decision may be based on measurement reports, for example, those received at 202, and/or radio resource management (RRM) information. As part of the handover decision, the eNB 116 may identify a target eNB and/or ISW system to which one or more wireless connections presently served by the source ISW system 108 are to be transferred in a handover process.

At 204, the eNB 116 may transmit a HO request to the eNB 118 of the target ISW system 112. The HO request may request handover of a connection between the eNB 116 and the UE 104. The HO request may include information that may allow the eNB 118 to prepare for the handover. The information included in the HO request may include UE X2 signalling context reference at eNB 116, UE S1 EPC signalling context reference, target cell ID (corresponding to the eNB 118), an eNB key sent to the MeNB 116 from the EPC when the UE 104 entered ECM-CONNECTED state, radio resource control (RRC) context including the cell-radio network temporary identifier (C-RNTI) of the UE 104 in the eNB 116, access stratum (AS) configuration, EUTRAN radio access bearer (E-RAB) context, and physical layer ID of the source cell (corresponding to the eNB 116) plus short media access control identifier (MAC-I) for possible radio link failure (RLF) recovery). UE X2/UE S1 signalling references may enable the eNB 118 to address the eNB 116 and the EPC. The E-RAB context may include radio network layer (RNL) and transport network layer (TNL) addressing information, and quality of service (QoS) profiles of the E-RABs.

In some embodiments, the HO request may further include WLAN context information of the UE 104 to facilitate integration of management of the WLAN connections within the 3GPP management protocols. The WLAN context information may include a WLAN identifier of the UE 104. In some embodiments, the WLAN identifier may be a MAC address of the UE 104.

In some embodiments, the WLAN context information may additionally/alternatively include WLAN QoS information. The WLAN QoS information may correspond to a level of QoS requested by the UE 104 with respect to the WLAN connection. In some embodiments, the WLAN QoS information may be in the form of a resource information container (RIC)-request, e.g., an Institute of Electronics and Electrical Engineers (IEEE) 802.11r-2008 based RIC-request.

In some embodiments, the WLAN context information may additionally/alternatively include a WLAN security context of the UE 104. The WLAN security context may include, for example, a WLAN pairwise master key (PMK). When 802.1X authentication is used for WLAN access, the initial 802.1X authentication may be enabled by the eNB 116 pushing a UE identity and a corresponding long-term credential into a local AAA server. The PMK may be agreed between the UE 104 and the AAA server upon initial 802.1X authentication and may be provided to the AP 120. Sending the PMK parameter to a potential target WLAN AP (as part of the 3GPP handover procedure) may allow fast reauthentication between the UE 104 and the AP 122, for example, without involvement of a local AAA server. If fast reauthentication fails, the UE 104 may fall back to a full 802.1X authentication, with local AAA server involvement, using the UE identity and the corresponding long-term credential provided by the eNB 116. Fast reauthentication is described further in FIG. 3 in accordance with some embodiments.

When pre-shared key (PSK) authentication is used for WLAN access, the PMK may be equal to the PSK.

At 205, the eNB 118 may perform various admission control procedures. The admission control may be performed by the eNB 118 based on the received E-RAB and/or WLAN QoS information to increase the likelihood of a successful handover if appropriate resources can be granted by the eNB 118 and/or AP 122. The eNB 118 may configure resources according to the received E-RAB and/or WLAN QoS information and may reserve a C-RNTI and, optionally, a random access channel (RACH) preamble. The AS-configuration to be used in the cell associated with eNB 118 may be independently established or updated based on the AS-configuration used in the cell associated with eNB 116.

At 206, the eNB 118 may send an HO request acknowledgment message to the eNB 116. The HO request acknowledgment message may include a transparent container to be sent to the UE 104 as an RRC message to perform the handover. The container may include a new C-RNTI, target eNB security algorithm identifiers for selected security algorithms, a dedicated RACH preamble, access parameters, system information blocks (SIBs), etc. The HO request acknowledgment message may also include RNL/TNL information for the forwarding tunnels, if necessary.

In some embodiments, the HO request acknowledgment message may include target WLAN information. The target WLAN information may include, but is not limited to, a target WLAN identifier (for example, a service set identifier (SSID) associated with the AP 122, a basic service set identifier (BSSID) associated with the AP 122, etc.), target eNB's V-MAC addresses for p2p links, target WLAN security context (for example, a WLAN PMK), UE's granted QoS information (for example, IEEE 802.11r-2008-based RIC-Response).

While the present embodiment describes exchanging a PMK as part of the handover request and acknowledgment at 204 and 206, in other embodiments the PMK may be directly exchanged over the 802.11 distribution medium (DS), directly from a local authentication, authorization, and accounting (AAA) server to all WLAN APs in a given subnet, or on the APs themselves.

Following 206, the eNB 116 may stop forwarding downlink packet to the AP 120 and may start forwarding them to the eNB 118.

At 207, the eNB 118 may generate an RRC message to be sent to the UE 104 to perform the handover. In some embodiments, the RRC message may be an RRCConnectionReconfiguration message that includes mobilityControlInformation. The UE 104 may receive the RRCConnectionReconfiguration message with necessary parameters (for example, new C-RNTI, target eNB security algorithm identifiers, and optionally dedicated RACH preamble, target eNB SIBS, etc.) and may be commanded by the eNB 116 to perform the HO.

In some embodiments, the target WLAN information transmitted in the HO request acknowledgment message, or portions thereof, may also be included in the RRCConnectionReconfiguration message. In this manner, the UE 104 may include information to facilitate subsequent WLAN handover procedures.

Following 207, the UE 104 may stop sending packets over the source WLAN and may detach from the cell of the eNB 116 and may sync with the cell of the eNB 118. The eNB 116 may deliver buffered and/or in transit packets to the UE 104 and/or the S-GW 132.

At 208, the eNB 116 may send a sequence number (SN) status transfer message to the eNB 118 to convey an uplink (UL) packet data convergence protocol (PDCP) SN receiver status and a downlink PDCP SN transmitter status of E-RABs for which PDCP status preservation applies, for example, for radio link control (RLC) acknowledged mode (AM). The uplink PDCP SN receiver status may include at least the PDCP SN of the first missing uplink (UL) service data unit (SDU) and may include a bit map of the receive status of the out-of-sequence UL SDUs that the UE 104 needs to retransmit in the target cell, if there are any such SDUs. The downlink PDCP SN transmitter status indicates the next PDCP SN that the target eNB shall assign to new SDUs, not having a PDCP SN yet. The eNB 116 may omit sending this message if none of the E-RABs of the UE 104 shall be treated with PDCP status preservation.

In some embodiments, some or all of the WLAN context information may be transmitted with the SN status transfer message. This may be in addition to, or as an alternative to, transmitting the WLAN context information in the handover request at 204.

At 209, after receiving the RRCConnectionReconfiguration message including the mobilityControlInformation, the UE 104 may perform synchronisation to eNB 118 and may access the target cell via RACH, following a contention-free procedure if a dedicated RACH preamble was indicated in the mobilityControlInformation, or following a contention-based procedure if no dedicated preamble was indicated. The UE 104 may derive specific keys of the eNB 118 and configure the selected security algorithms to be used in the target cell.

At 210, the eNB 118 may respond with UL allocation and timing advance (TA) for the UE 104.

At 211, when the UE 104 has successfully accessed the target 3GPP cell, the UE 104 may send an RRCConnectionReconfigurationComplete message, including a C-RNTI, to confirm the handover to the eNB 118 to indicate that the 3GPP handover procedure is completed for the UE 104. If available, the UE 104 may send an uplink Buffer Status Report along with the RRCConnectionReconfigurationComplete message. The eNB 118 may verify the C-RNTI sent in the RRCConnectionReconfigurationComplete message and begin sending data to the UE 104.

At 212, the eNB 118 may send a PATH SWITCH REQUEST message to the MME 132 to inform the MME 132 that the UE 104 has changed cells.

At 213, the MME 132 may send a MODIFY BEARER REQUEST message to the S-GW 132 so that the S-GW 132 may, at 214, switch the downlink (DL) data path to the target side. The S-GW 132 may send one or more "end marker" packets on the old path to the eNB 116 and may then release any user-plane (U-plane)/TNL resources towards the eNB 116.

At 215, the S-GW 132 may send a MODIFY BEARER RESPONSE message to MME 132.

At 216, the MME 132 may confirm the PATH SWITCH REQUEST message with a PATH SWITCH REQUEST ACKNOWLEDGE message transmitted to the eNB 118.

At 217, the eNB 118 may send a UE CONTEXT RELEASE message to the eNB 116 to inform the eNB 116 of a successful handover. The UE CONTEXT RELEASE message may trigger the release of resources by the eNB 116. The eNB 118 sends the UE CONTEXT RELEASE message after the PATH SWITCH REQUEST ACKNOWLEDGE message is received from the MME 132.

At 218, the eNB 116 may release radio and C-plane related resources associated with the UE context. Any ongoing data forwarding may continue.

At 219-222, the UE 104 may engage with the AP 122 to complete a WLAN handover procedure enabled and facilitated through the transmission of the UE's WLAN context and the target WLAN information discussed above. The UE 104 may only handover the WLAN connection to one of the WLANs as specified in the target WLAN information. In some embodiments, the WLAN handover procedure may be an IEEE 802.11-based WLAN handover.

In particular, at 219 the UE 104 may send an authentication request, including authentication information, to the AP 122. It may be noted that the UE 104 may only handover to one of the WLAN's as specified in the previously received target WLAN information.

The AP 122 may confirm the authentication information included in the authentication request and may, at 220, transmit an authentication response to the UE 104.

Following a successful authentication, at 221, the UE 104 may transmit a re-association request to the AP 122. In some embodiments, the re-association request may include information about the UE's 104 association with AP 120.

At 222, the AP 122 may transmit a re-association response to the UE 104. If the re-association is successful, the re-association response may include an association ID of the requester, for example, the UE 104.

After 222, the UE 104 may move its data radio bearers (DRBs) from eNB 118 to AP 122, or vice versa.

Figure 3:
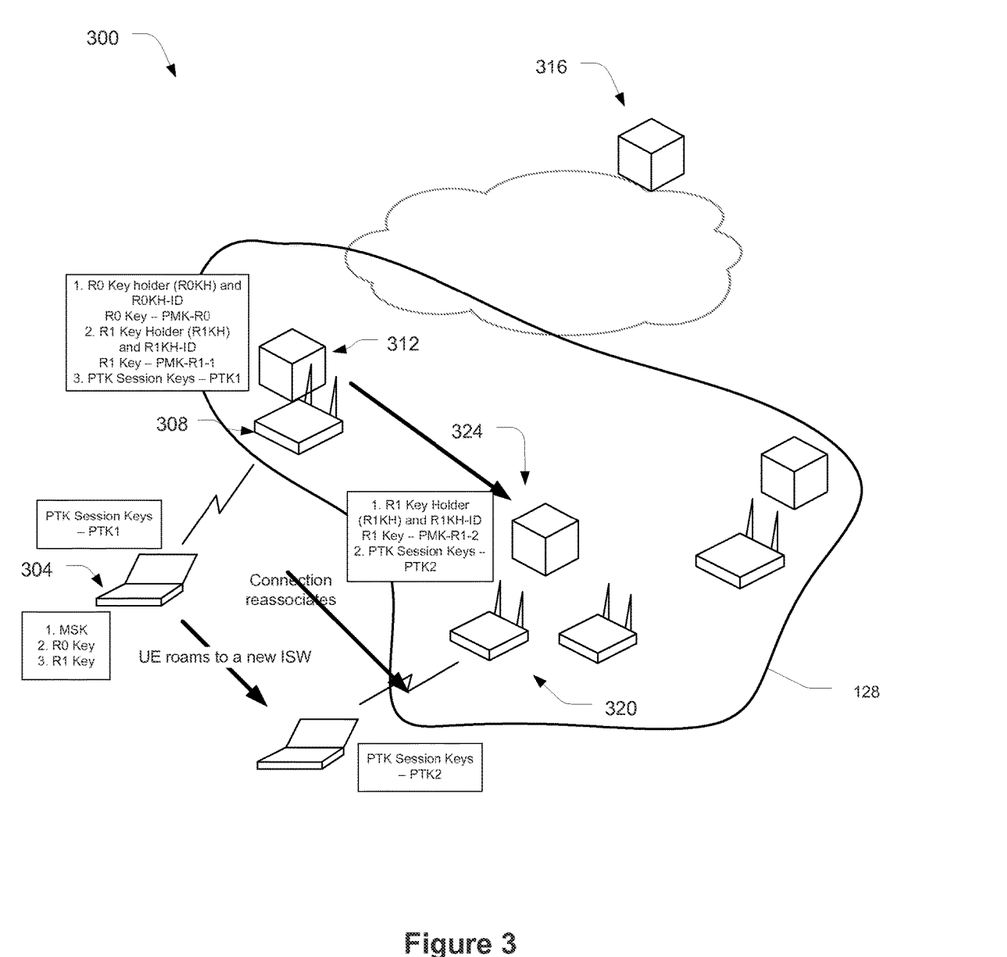
FIG. 3 illustrates a wireless communication environment in which a fast transition key distribution process is performed in accordance with various embodiments.

In some embodiments, the 3GPP handover request and acknowledgment, for example, 204 and 206 of FIG. 2, and the WLAN handover procedure, for example, 219-222 of FIG. 2 may be implemented according to a fast transition key distribution process. FIG. 3 illustrates a wireless communication environment 300 in which a fast transition key distribution process is further described in accordance with some embodiments.

Initially, a user equipment 304 may be associated with a first ISW 308. The ISW 308 may include a FAT AP that has an integrated WLAN access controller 312. The ISW 308 may include a AAA client that interacts with a AAA server 316. The AAA client may be a network access server and/or remote authentication dial-in user service (RADIUS) client. The AAA server 316 may be an authentication/RADIUS server that includes a AAA key such as, for example, an MSK. The AAA server 316 may deliver the MSK to the ISW 308 and the UE 304 when the UE 304 authenticates with the AAA server 316 upon initial association.

The WLAN access controller 312 may be an R0 key holder, which may be referred to as R0KH, and also may have the R0KH-ID, which may be a MAC address of an AP of the ISW 308. The WLAN access controller 312 may use the MSK to compute the first level PMK, for example, PMK-R0. The WLAN access controller 312 may use the PMK-R0 and an identity of an R1 keyholder (R1KH), which may also be the WLAN access controller 312 for the initial association, to generate a second level PMK, for example, PMK-R1. The PMK-R1 key may then be used in deriving a first PTK session keys (PTK1).

The UE 304 may use the MSK to derive the PMK-R0, PMK-R1, and PTK keys in a similar manner as the WLAN controller 312. The keys derived by the UE 104 may match those derived by the WLAN access controller 312 as both use the same ingredients in the same key derivation function. With the keys properly derived, the UE 304 may have a secure association with the AP of the ISW 308.

If the UE 304 observes deterioration in the quality of the wireless connection with the ISW 308, the UE 304 may initiate fast transition (FT) operations in order to reassociate the wireless connections with another ISW that is capable of providing appropriate QoS levels given the nature of the communication session. In various embodiments, the communication session may include delay and/or jitter sensitive network traffic such as, but not limited to, streaming multimedia, Internet protocol (IP) telephony (e.g., voice-over IP (VoIP)), video teleconferencing, etc. Accordingly, it may be desirable for an FT operation to occur in a manner such that a detectable disruption to the established communication session may be avoided.

As used herein, "fast transitioning," which may also be referred to as "fast roaming," may be compatible with the fast transition operations described in one or more of the Institute of Electrical and Electronics Engineers (IEEE) wireless standards, e.g., the 802.11-2007 standards along with any revisions, amendments or updates thereto including, but not limited to, 802.11r amendments regarding fast basic service set transitions.

In the described embodiment, the UE 304 may decide to transition to ISW 320. ISW 320 may include a lightweight AP that is non-co-located with the WLAN access controller 324. A target eNB may be co-located with the access controller 324 or the lightweight AP.

The UE 304 may then derive a PMK-R1 for ISW 320 by using WLAN access controller 324 as the R1KH. The WLAN access controller 324 may receive PMK-R0 from ISW 308 over a distribution medium and may also derive PMK-R1, similar to the UE 304. The PMK-R0 may be transmitted to the WLAN access controller 324 through the WLAN context information that is included in the handover request as discussed above at step 204 of FIG. 2. The UE 304 may then reassociate with ISW 320 and both the WLAN access controller 324 and the UE 304 may derive second PTK session keys (PTK2) in a manner similar to the one described above with respect to PTK1.

While the ISW 320 is shown to include a lightweight AP, in other embodiments it may be a FAT AP that is co-located with the WLAN access controller 324. Still further, embodiments of the present invention may transition connections from an ISW to an AP and a non-collocated eNB and vice versa.

Figure 4:
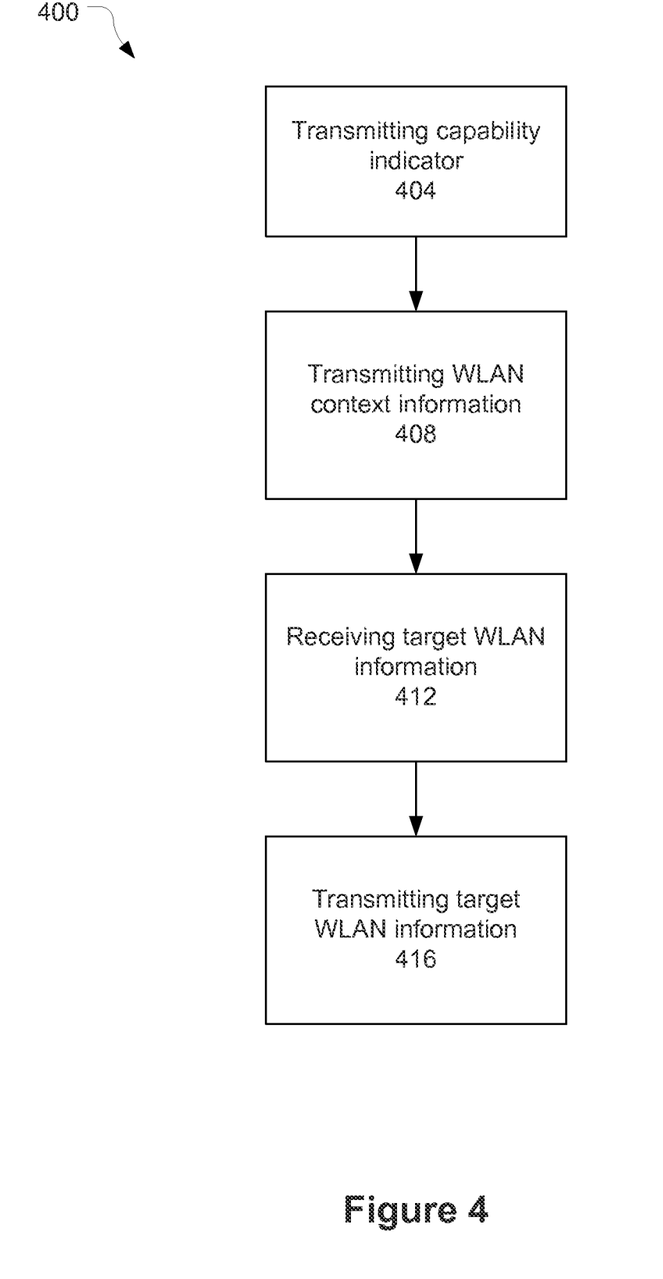
FIG. 4 is a flowchart illustrating a method of operating an eNB in accordance with various embodiments.

FIG. 4 is a flowchart illustrating a method 400 of operating an eNB of a source ISW system in accordance with embodiments of the present disclosure. The method 400 may be performed by an eNB, for example, eNB 116, having circuitry designed, programmed, and/or configured to carry out the described operations.

At 404, the method 400 includes transmitting a capability indicator. The eNB may transmit a capability indicator to a UE via a new or existing RRC message. In some embodiments, the capability indicator may be included in an RRC connection reconfiguration message.

The capability indicator may provide an enabled indication or a non-enabled indication. The enabled indication may instruct the UE to trigger WLAN inter-AP handover based on 3GPP handover message, for example, the message at 204 or 206 as described with reference to embodiments of the present disclosure. The non-enabled indication may instruct the UE to trigger WLAN handover normally based on its current implementation.

At 408, the method 400 may include transmitting the WLAN context information to an eNB of a target ISW system. The WLAN context information may include the information described above with respect to FIG. 1. The WLAN context information may be transmitted in a handover request, for example, the HO request at 204. Additionally or alternatively, the WLAN context information may be transmitted in a SN status transfer message, for example, SN status transfer at 208. The WLAN context information may be transmitted over an X2 interface.

At 412, the method 400 may include receiving target WLAN information from the eNB of the target ISW system. The target WLAN information may include the information described above with respect to FIG. 1. The target WLAN information may be received in a handover request acknowledgment, for example the HO request acknowledgment at 206. The target WLAN information may be received over the X2 interface.

At 416, the method 400 may include transmitting the target WLAN information to the UE. The target WLAN information may be transmitted in an RRC connection reconfiguration message, for example RRC connection reconfiguration at 207.

Figure 5:
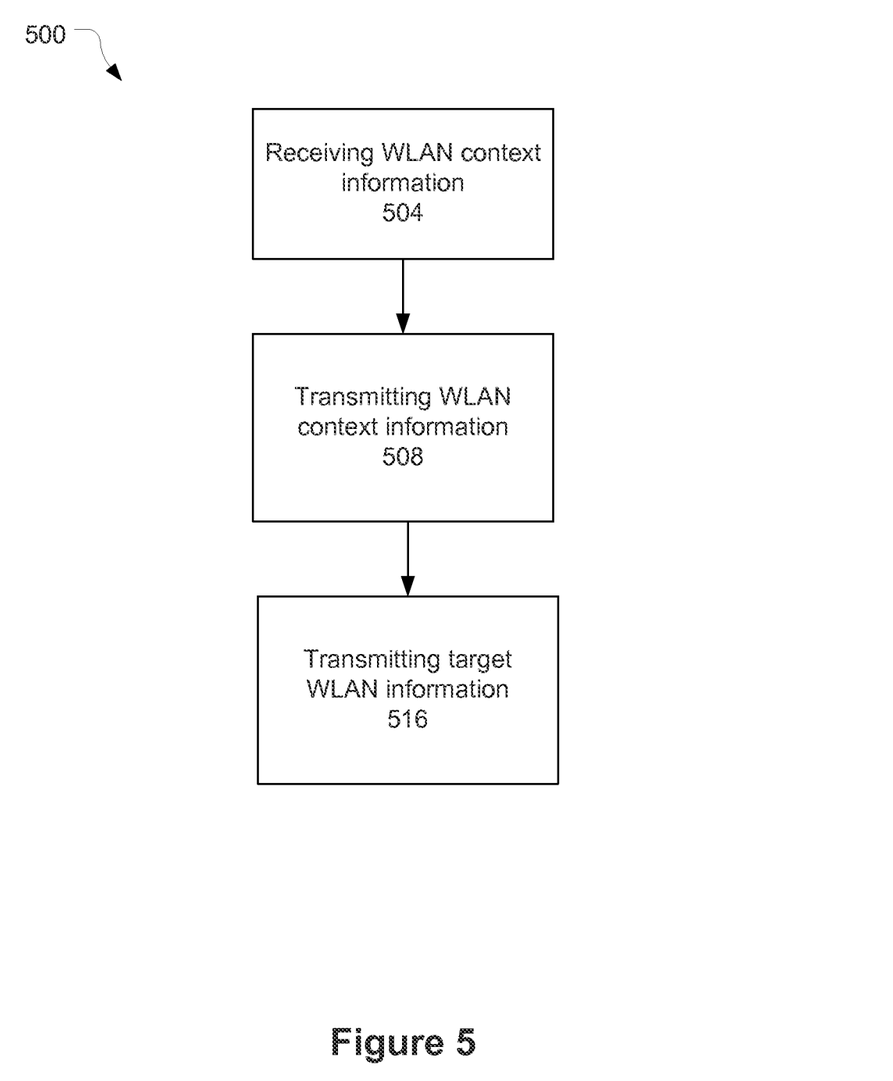
FIG. 5 is a flowchart illustrating a method of operating an eNB in accordance with various embodiments.

FIG. 5 is a flowchart illustrating a method 500 of operating an eNB of a target ISW system in accordance with embodiments of the present disclosure. The method 500 may be performed by an eNB, for example, eNB 118, having circuitry designed, programmed, and/or configured to carry out the described operations.

At 504, the method 500 may include receiving WLAN context information. The eNB may receive the WLAN context information from an eNB of a source ISW system. The WLAN context information may be received in a handover request, for example, HO request at 204, and/or in an SN status transfer message, for example, SN status transfer at 208. The WLAN context information may include information as described above with respect to FIG. 1. The WLAN context information may be received over an X2 interface.

At 508, the method 500 may include transmitting WLAN context information. Some or all of the WLAN context information received by the eNB of the target ISW system may be forwarded to an AP of the target ISW system. This may allow the AP of the target ISW system to prepare the WLAN connection for the UE.

At 516, the method 500 may include transmitting target WLAN information. The eNB may transmit the target WLAN information in a handover request acknowledgment to the eNB 116. The target WLAN information may include information as described above with respect to FIG. 1. The target WLAN information may be transmitted over the X2 interface.

Figure 6:
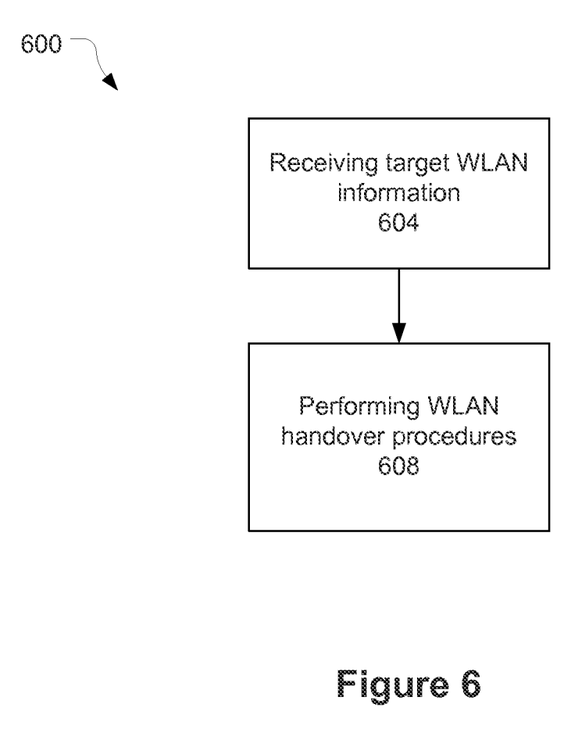
FIG. 6 is a flowchart illustrating a method of operating a UE in accordance with various embodiments.

FIG. 6 is a flowchart illustrating a method 600 of operating a UE in accordance with embodiments of the present disclosure. The method 600 may be performed by a UE, for example, UE 104, having circuitry designed, programmed, and/or configured to carry out described operations.

At 604, the method 600 may include receiving target WLAN information. The UE may receive the target WLAN information in an RRC connection reconfiguration message from the source eNB. The target WLAN information may include information as described above with respect to FIG. 1. The target WLAN information may be received by the UE over a Uu or Yy interface.

At 608, the method 600 may include performing WLAN handover procedures. The WLAN handover procedures may include transmitting an authentication request to a target AP, receiving an authentication response from the target AP, transmitting a re-association request to the target AP, and receiving a re-association response from the target AP. These WLAN handover procedures may be similar to those described above with respect messages of 219-222 of FIG. 2. The performance of the WLAN handover procedures may be based on the previously received target WLAN information. This may accelerate the WLAN handover procedures performed by the UE 104.

Figure 7:
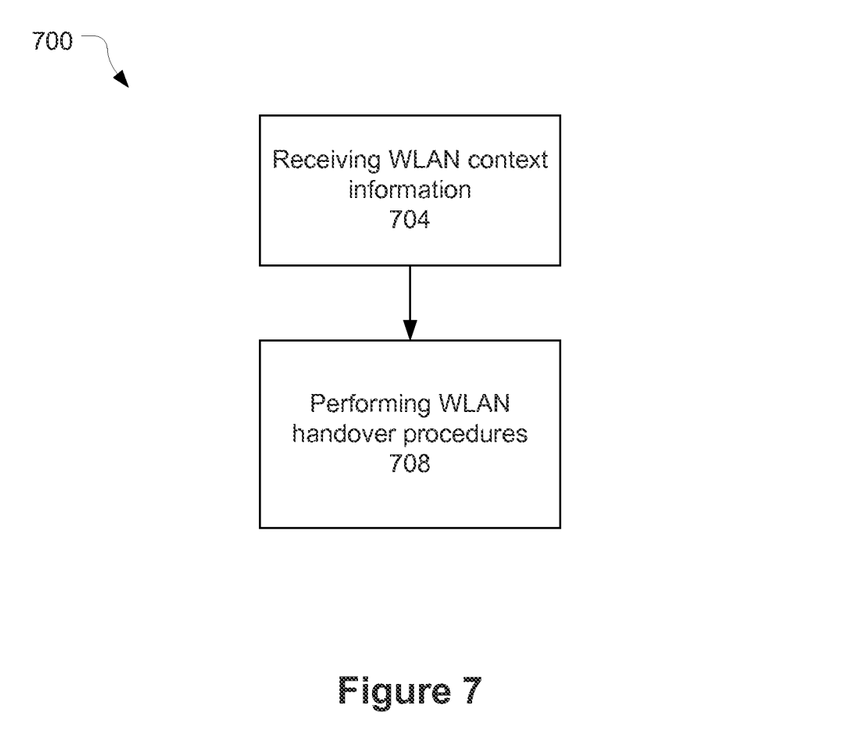
FIG. 7 is a flowchart illustrating a method of operating an AP in accordance with various embodiments.

FIG. 7 is a flowchart illustrating a method 700 of operating an AP in accordance with embodiments of the present disclosure. The method 700 may be performed by a target AP, for example, AP 122, having circuitry designed, programmed, and/or configured to carry out described operations.

At 704, the method 700 may include receiving WLAN context information. The AP may receive the WLAN context information from the target eNB. The WLAN context information may include information that described above with respect to FIG. 1.

At 708, the method 700 may include performing WLAN handover procedures. The WLAN handover procedures may include receiving an authentication request from the UE, transmitting an authentication response to the UE, receiving a re-association request from the UE, and transmitting a re-association response to the UE. These WLAN handover procedures may be similar to those described above with respect messages of 219-222 of FIG. 2. The performance of the WLAN handover procedures may be based on the previously received WLAN context information. This may accelerate the WLAN handover procedures performed by the AP 122.

Figure 8:
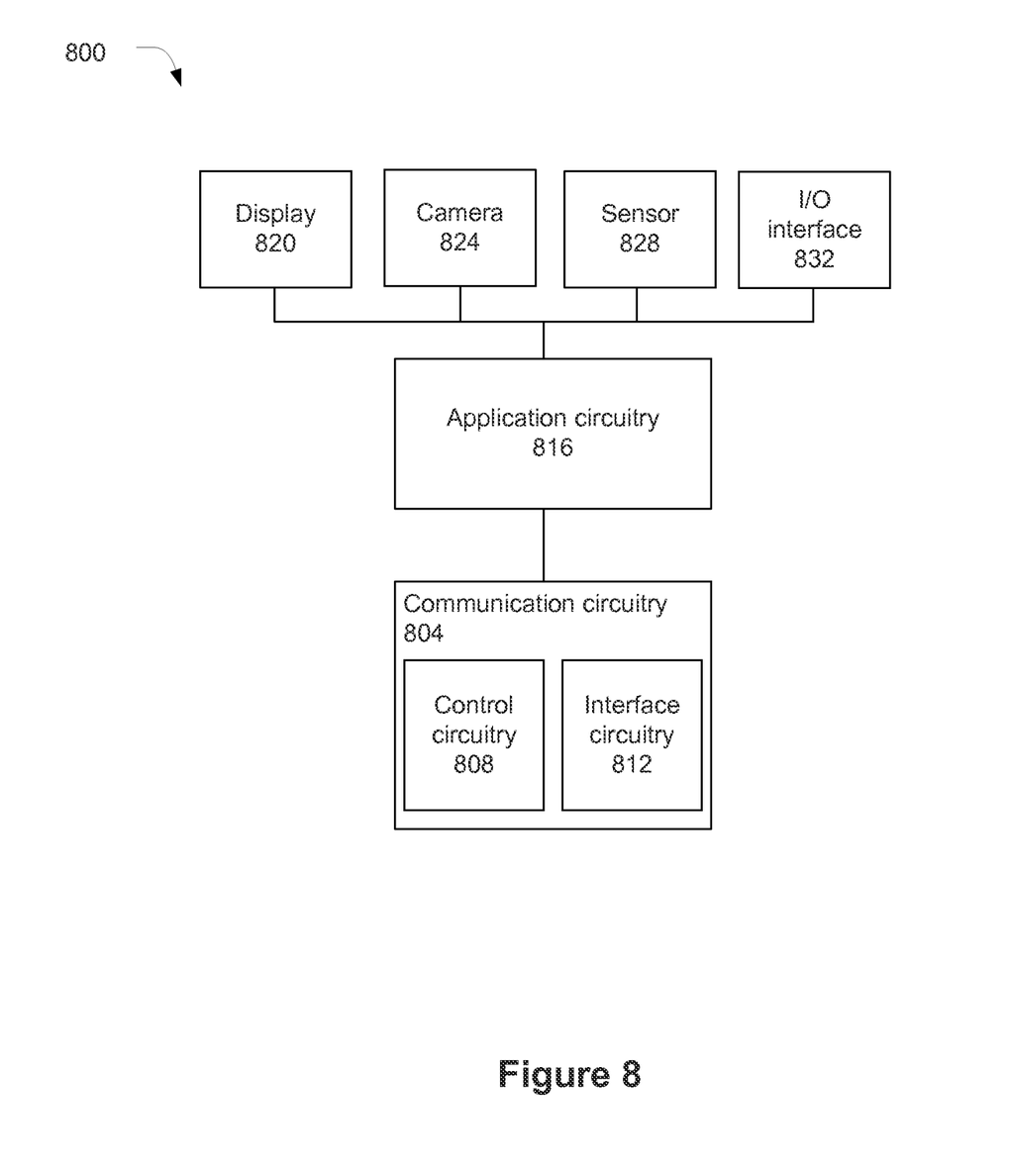
FIG. 8 is a block diagram of an example system that may be used to practice various embodiments described herein.

The components described herein may be implemented into a system using any suitable hardware, firmware, and/or software configured as desired. FIG. 8 illustrates, for one embodiment, an example system 800 comprising communication circuitry 804, which includes control circuitry 808 and interface circuitry 812, application circuitry 816, display 820, camera 824, sensor 828, and input/output (I/O) interface 832, coupled with each other at least as shown.

The application circuitry 808 may include circuitry to enable various applications and/or operating systems running on the system 800.

The control circuitry 808 of the communication circuitry 804 may generate the various messages with the content described herein and may control the interface circuitry 812 to transmit the messages over appropriate communication interfaces. The control circuitry 808 may, in particular, control the handover process operations described herein.

The interface circuitry 812 may include appropriate circuitry to communicate with one or more remote entities by the appropriate communication protocols. For example, in embodiments in which the system 800 embodies an ISW or a UE, the interface circuitry 812 may include circuitry designed to communicate using both cellular RAN protocols, for example, EUTRAN protocols, and WLAN protocols. In embodiments in which the system 800 embodies an AP, the interface circuitry 812 may include circuitry designed to communicate using WLAN protocols.

In some embodiments, the interface circuitry 812 may include circuitry designed to communicate with other components over wired communication links/networks. For example, in an embodiment in which the system 800 embodies an eNB, the interface circuitry 812 may include circuitry designed to communicate using an Ethernet protocol.

In some embodiments, some or all of the constituent components of the communication circuitry 804 may be implemented together on a system on a chip (SOC). In other embodiments, one or more of the constituent components of the communication circuitry 804 may be implemented in discrete hardware. For example, in some embodiments, the interface circuitry 812 may include a cellular radio to communicate using EUTRAN protocols and may include a separate radio to communicate using WLAN protocols.

In various embodiments, the I/O interface 832 may include one or more user interfaces designed to enable user interaction with the system 800 (especially when the system 800 represents a UE) and/or peripheral component interfaces designed to enable peripheral component interaction with the system 800. User interfaces may include, but are not limited to, a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, sensor 828 may include one or more sensing devices to determine environmental conditions and/or location information related to the system 800. In some embodiments, the sensors may include, but are not limited to, a gyro sensor, an accelerometer, a proximity sensor, an ambient light sensor, and a positioning unit. The positioning unit may also be part of, or interact with, the communication circuitry 804 to communicate with components of a positioning network, e.g., a global positioning system (GPS) satellite.

In various embodiments, the display 820 may include a display (e.g., a liquid crystal display, a touch screen display, etc.).

In various embodiments, the system 800 may be a UE such as, for example, a laptop computing device, a tablet computing device, a netbook, an ultrabook, a smartphone, etc. In various embodiments, the system 800 may be an eNB, an AP, or an ISW system. In various embodiments, system 800 may have more or fewer components, and/or different architectures.

The following paragraphs describe examples of various embodiments.

Example 1 includes a system that comprises a wireless local area network (WLAN) node to facilitate provision of a WLAN cell; and an evolved node B (eNB), co-located with the WLAN node, to provide an evolved universal terrestrial radio access network (EUTRAN) cell, wherein the eNB is to receive WLAN context information for the user equipment (UE) from a source eNB, wherein the WLAN context information is to be received in a handover request that requests handover of a connection between the UE and the source eNB or a system number (SN) status transfer message.

Example 2 includes the system of example 1, wherein the WLAN context information includes a WLAN identifier of the UE; WLAN quality of service (QoS) information that corresponds to a level of QoW requested by the UE with respect to a WLAN connection; or a WLAN security context of the UE.

Example 3 includes the system of example 2, wherein the WLAN context information includes the WLAN identifier, which comprises a media access control (MAC) address.

Example 4 includes the system of example 2, wherein the WLAN context information includes the WLAN QoS information as a resource information container (RIC) request.

Example 5 includes the system of example 2, wherein the WLAN context information includes the WLAN security context, which includes a WLAN pairwise master key (PMK).

Example 6 includes the system of any of examples 1-5, wherein the eNB is further to transmit a handover request acknowledgment message to the source eNB based on the handover request, wherein the handover request acknowledgment message includes target WLAN information corresponding to the WLAN cell.

Example 7 includes the system of example 6, wherein the target WLAN information includes an identifier of the WLAN cell, a media access control (MAC) address of the eNB (for example, a V-MAC), a security context for the WLAN cell, or granted QoS information for the UE.

Example 8 includes the system of example 7, wherein the target WLAN information includes the MAC address of the eNB, wherein the MAC address is to be used for point-to-point link between the eNB and the UE through the WLAN access point.

Example 9 includes eNB circuitry comprising: control circuitry to: receive one or more measurement reports from a user equipment (UE); identify a target eNB to which a wireless connection is to be transferred in a handover process; generate a message to the target eNB as part of the handover process, the message to include wireless local area network (WLAN) context information corresponding to the UE; and interface circuitry to transmit the message to the target eNB.

Example 10 includes eNB circuitry of example 9, wherein the message is a handover request or a system number (SN) status transfer message.

Example 11 includes the eNB circuitry of example 9 or 10, wherein the WLAN context information includes a WLAN identifier of the UE; WLAN quality of service (QoS) information; or a WLAN security context of the UE.

Example 12 includes the eNB circuitry of example 11, wherein the WLAN context information includes the WLAN identifier, which comprises a media access control (MAC) address.

Example 13 includes the eNB circuitry of any of examples 9-12, wherein the WLAN context information includes the WLAN security context, which includes a WLAN pairwise master key (PMK).

Example 14 includes the eNB circuitry of any of examples 9-13, wherein the control circuitry is to: generate a radio resource control (RRC) message to include a capability indicator to the UE to indicate that the UE is to trigger a WLAN inter-access point (AP) handover based on a $3^{rd}$ Generation Partnership Project (3GPP) handover message; and control the interface circuitry to transmit the RRC message.

Example 15 includes the eNB circuitry of example 14, wherein the RRC message is an RRC connection reconfiguration message.

Example 16 includes one or more non-transitory computer readable media having instructions that, when executed, cause a UE to: process, as part of an evolved universal terrestrial radio access network (EUTRAN) handover, a radio resource control (RRC) connection reconfiguration message that includes target wireless local area network (WLAN) information; and perform a WLAN handover procedure based on the target WLAN information.

Example 17 includes the one or more non-transitory computer readable media of claim 16, wherein to perform the handover procedure, the UE is to: transmit, to a target access point (AP) or access controller (AC), an authorization request; process an authorization response received from the target AP or AC based on the authorization request; transmit, to the target AP or AC, a re-association request based on the authorization response; and process a re-association response received from the target AP or AC.

Example 18 includes the one or more non-transitory computer readable media of example 16 or 17, wherein the UE is to perform the WLAN handover procedure according to a fast transition key distribution process.

Example 19 includes the one or more non-transitory computer readable media of any of examples 16-18, wherein the UE is to perform a fast reauthentication with the target AP or AC.

Example 20 includes the one or more non-transitory computer readable media of any of examples 16-19, wherein the target WLAN information includes an identifier of the WLAN cell, a virtual media access control (MAC) address of the eNB, a security context for the WLAN cell, or granted QoS information for the UE.

Example 21 includes a method comprising: providing, with a WLAN access point, a WLAN cell; providing, with an evolved node B (eNB) co-located with the WLAN access point, an evolved universal terrestrial radio access network (EUTRAN) cell; receiving, by the eNB, WLAN context information for the user equipment (UE) from a source eNB, wherein the WLAN context information is to be received in a handover request that requests handover of a connection between the UE and the source eNB or a system number (SN) status transfer message.

Example 22 includes the method of example 21, wherein the WLAN context information includes a WLAN identifier of the UE; WLAN quality of service (QoS) information that corresponds to a level of QoW requested by the UE with respect to a WLAN connection; or a WLAN security context of the UE.

Example 23 includes the method of example 22, wherein the WLAN context information includes the WLAN identifier, which comprises a media access control (MAC) address.

Example 24 includes the method of example 22, wherein the WLAN context information includes the WLAN QoS information as a resource information container (RIC) request.

Example 25 includes the method of example 22, wherein the WLAN context information includes the WLAN security context, which includes a WLAN pairwise master key (PMK).

Example 26 includes the method of any of examples 21-25, wherein the eNB is further to transmit a handover request acknowledgment message to the source eNB based on the handover request, wherein the handover request acknowledgment message includes target WLAN information corresponding to the WLAN cell.

Example 27 includes the method of example 26, wherein the target WLAN information includes an identifier of the WLAN cell, a media access control (MAC) address of the eNB, a security context for the WLAN cell, or granted QoS information for the UE.

Example 28 includes a method of example 27, wherein the target WLAN information includes the MAC address of the eNB, wherein the MAC address is to be used for point-to-point link between the eNB and the UE through the WLAN access point.

Example 29 includes an eNB comprising: means for receiving one or more measurement reports from a user equipment (UE); means for identifying a target eNB to which a wireless connection is to be transferred in a handover process; means for generating a message to the target eNB as part of the handover process, the message to include wireless local area network (WLAN) context information corresponding to the UE; and means for transmitting the message to the target eNB.

Example 30 includes the eNB of example 29, wherein the message is a handover request or a system number (SN) status transfer message.

Example 31 includes the eNB of example 29 or 30, wherein the WLAN context information includes a WLAN identifier of the UE; WLAN quality of service (QoS) information; or a WLAN security context of the UE.

Example 32 includes the eNB of example 31, wherein the WLAN context information includes the WLAN identifier, which comprises a media access control (MAC) address.

Example 33 includes the eNB of any of examples 29-32, further comprising means for generating a radio resource control (RRC) message to include a capability indicator to the UE to indicate that the UE is to trigger a WLAN inter-access point (AP) handover based on a $3^{rd}$ Generation Partnership Project (3GPP) handover message.

Example 34 includes a UE with circuitry to: process, as part of an evolved universal terrestrial radio access network (EUTRAN) handover, a radio resource control (RRC) connection reconfiguration message that includes target wireless local area network (WLAN) information; and perform a WLAN handover procedure based on the target WLAN information.

Example 35 includes the UE of example 34, wherein to perform the handover procedure, the circuitry is to: transmit, to a target access point (AP) or access controller (AC), an authorization request; process an authorization response received from the target AP or AC based on the authorization request; transmit, to the target AP or AC, a re-association request based on the authorization response; and process a re-association response received from the target AP or AC.

Example 36 includes the UE of example 34 or 35, wherein the circuitry is to perform the WLAN handover procedure according to a fast transition key distribution process.

Example 37 includes the UE of any of examples 34-36, wherein the circuitry is to perform a fast reauthentication with the target AP or AC.

Example 38 includes the UE of any of examples 34-37, wherein the target WLAN information includes an identifier of the WLAN cell, a virtual media access control (MAC) address of the eNB, a security context for the WLAN cell, or granted QoS information for the UE.

Example 39 includes a method comprising: processing, as part of an evolved universal terrestrial radio access network (EUTRAN) handover, a radio resource control (RRC) connection reconfiguration message that includes target wireless local area network (WLAN) information; and performing a WLAN handover procedure based on the target WLAN information.

Example 40 includes the method of example 39, wherein performing the handover procedure comprises: transmitting, to a target access point (AP) or access controller (AC), an authorization request; processing an authorization response received from the target AP or AC based on the authorization request; and transmitting, to the target AP or AC, a re-association request based on the authorization response; and process a re-association response received from the target AP or AC.

Example 41 includes the method of example 39 or 40, further comprising: performing the WLAN handover procedure according to a fast transition key distribution process.

The description herein of illustrated implementations, including what is described in the Abstract, is not intended to be exhaustive or to limit the present disclosure to the precise forms disclosed. While specific implementations and examples are described herein for illustrative purposes, various equivalent modifications are possible within the scope of the disclosure, as those skilled in the relevant art will recognize. These modifications may be made to the disclosure in light of the above detailed description.

What is claimed is:

1. A system comprising:
a wireless local area network (WLAN) node to facilitate provision of a WLAN cell; and
an evolved node B (eNB), co-located with the WLAN node, to:
provide an evolved universal terrestrial radio access network (EUTRAN) cell;
receive WLAN context information for a user equipment (UE) from a source eNB, wherein the WLAN context information is to be received in a handover request that requests handover of a connection between the UE and the source eNB, the WLAN context information to include a WLAN identifier of the UE; WLAN quality of service (QoS) information that corresponds to a level of QoS requested by the UE with respect to a WLAN connection; and a WLAN security context of the UE; and
transmit a handover request acknowledgement message to the source eNB based on the handover request, the handover request acknowledgment message to include target WLAN information corresponding to the WLAN cell,
wherein the WLAN security context includes a WLAN pairwise master key (PMK).

2. The system of claim 1, wherein the WLAN identifier comprises a media access control (MAC) address.

3. The system of claim 1, wherein the WLAN QoS information comprises a resource information container (RIC) request.

4. The system of claim 1, wherein the target WLAN information includes an identifier of the WLAN cell, a virtual media access control (MAC) address of the eNB, a security context for the WLAN cell, or granted QoS information for the UE.

5. The system of claim 4, wherein the target WLAN information includes the virtual MAC address of the eNB, wherein the virtual MAC address is to be used for a point-to-point link between the eNB and the UE through the WLAN node.

6. Evolved node B (eNB) circuitry comprising:
control circuitry to:
receive one or more measurement reports from a user equipment (UE);
identify a target eNB to which a wireless connection is to be transferred in a handover process;
generate a message to the target eNB as part of the handover process, the message to include wireless local area network (WLAN) context information corresponding to the UE; and
interface circuitry to:
transmit the message to the target eNB, wherein the message is a handover request and the WLAN context information includes a WLAN identifier of the UE; WLAN quality of service (QoS) information that corresponds to a level of QoS requested by the UE with respect to a WLAN connection; and a WLAN security context of the UE; and receive an acknowledgement message to a source eNB based on the handover request, the handover request acknowledgment message to include target WLAN information corresponding to a WLAN cell,
wherein the WLAN security context includes a WLAN pairwise master key (PMK).

7. The eNB circuitry of claim 6, wherein the WLAN identifier comprises a media access control (MAC) address.

8. The eNB circuitry of claim 6, wherein the control circuitry is to:
generate a radio resource control (RRC) message to include a capability indicator to the UE to indicate that the UE is to trigger a WLAN inter-access point (AP) handover based on a 3rd Generation Partnership Project (3GPP) handover message; and
control the interface circuitry to transmit the RRC message.

9. The eNB circuitry of claim 8, wherein the RRC message is an RRC connection reconfiguration message.

* * * * *